(No Model.) 2 Sheets—Sheet 1.

E. THOMSON.
SYSTEM OF ELECTRIC DISTRIBUTION.

No. 367,469. Patented Aug. 2, 1887.

WITNESSES:
Ernest Abshagen
Thos. Dorney

INVENTOR
Elihu Thomson
BY
H. C. Townsend
his ATTORNEY (No Model.) 2 Sheets—Sheet 2.

E. THOMSON.
SYSTEM OF ELECTRIC DISTRIBUTION.

No. 367,469. Patented Aug. 2, 1887.

WITNESSES:
Ernest Abshagen

INVENTOR
Elihu Thomson
BY
his ATTORNEY

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

SYSTEM OF ELECTRIC DISTRIBUTION.

SPECIFICATION forming part of Letters Patent No. 367,469, dated August 2, 1887.

Application filed August 20, 1884. Serial No. 141,792. (No model.)

*To all whom it may concern:*

Be it known that I, ELIHU THOMSON, a citizen of the United States, and a resident of Lynn, in the county of Essex and State of Massachusetts, have invented certain new and useful Improvements in Systems of Electric Distribution, of which the following is a specification.

My invention relates to means for electric distribution, whereby current on a main circuit supplied from a suitable source may be utilized in developing current on one or more local circuits electrically insulated from the main.

My invention relates more particularly to those systems employing a combined motor and alternating current-generator, the motor being fed by current supplied on the main circuit and kept of uniform volume by any suitable regulating devices, while the alternating current produced when the generator is driven by the motor is used to feed a local or separate circuit upon which are incandescent electric lamps or other translating devices. The alternating current is especially adapted to this use, as the lines are short and no commutator is required. The electro-motive force on the local is so low as not to occasion shocks if the line is touched, while the continuous current driving the motor may be of very high electro-motive force, and many of my distributers may be used in series upon such a circuit. The volume of current on the main line is kept constant by any desired means, preferably by the use, in conjunction with the dynamo, of a current governor or regulator for determining or varying the current generated or supplied thereby.

My invention consists in certain novel combinations relating to the regulation of such combined motors and generators, and more particularly hereinafter claimed.

In the accompanying drawings, Figure 1 is a diagram illustrating the manner of use of the combined motor and generator. Fig. 2 is a side view of a preferred form of the motor and generator. Fig. 3 is an end view of a disk carrying a portion of a governor mechanism for the motor. Fig. 4 is a side view of one form of the governor mechanism. Fig. 5 is an end view of the motor-armature, and Fig. 7 a similar view of the generator-armature. Fig. 6 illustrates the manner of winding and connecting the coil on the generator-armature. Fig. 8 illustrates one way of carrying out that portion of my invention which consists in regulating the current in the generator-circuit by automatically varying the speed or power of the motor through the agency of a magnet responding to changes in the generator-current and acting through suitable means upon the motor.

Referring to Fig. 1, G represents a self-regulating or otherwise regulated generator, or other arrangement of current supply and regulation whereby a standard or uniform current may be supplied to a line, $l\,l$, on which are placed in series combined motors and generators $M\,M'\,M^2$, with or without other devices on said line. The devices $M\,M'\,M^2$ feed local circuits $L\,L'\,L^2$, containing incandescent lamps in multiple arc or other translating devices arranged in multiple arc or otherwise. These circuits are insulated from the main circuit $l\,l$ at all points. Any form of generator G regulated for standard current will serve the purpose of my invention. The devices $M\,M'\,M^2$ consist of electric motors coupled to alternating current-generators, said motors being provided with means for limiting their speed, and said alternating generators being combined with means for limiting their electro-motive force.

Referring to Fig. 2, A A are the poles of field-magnets between which a motor-armature, V, revolves. Upon the same axis X is another armature, W, rotated between field-poles B B. Suitable coils, C C and C' C', traversed by a current from the main line, afford magnetism for A A and B B in the usual way. A commutator is provided for the motor-armature V, to which commutator the terminals of the armature coils are connected. Its armature winding or construction is of any desired kind and subject to wide variations. Said armature may be "Gramme" or "Siemens" wound, or otherwise. The armature V is driven by current from the main line $l\,l$, the circuit being, as indicated, to one commutator-brush $d$, to the armature, the other commutator-brush, coils C C C' C', and out. The armature W of the generator has preferably a single coil or winding upon a suitable iron core, and, as no commutation is used, its terminals are run to copper rings r r upon the shaft upon which stationary brushes b b, connected to the local circuit L, bear, thus permitting the alternating currents generated on the armature to be collected in the well-known way.

Fig. 3 shows a construction of a speed-governor for the motor. A suitable disk, D, bears two pivots, p p, upon which swing pieces of metal m m, pivoted at one end on said pivots, while the other ends are free, but held against the action of centrifugal force by the springs S S.

In Fig. 4, V is the armature; K, the commutator-cylinder; d d, the brushes; t t, connecting-links from the governor-pieces m m to the commutator-cylinder K, which latter is made movable longitudinally on the shaft and has inclined slots or insulating-divisions between its segments. As the pieces m m separate under the action of centrifugal force, the commutator is moved so that the brushes d d, which are narrower than the face of the commutator, bear upon places where their time of contact with the segments is changed. It is well known that in electric motors the position of the brushes relatively to the segments during revolution can be altered to modify the speed, or power, or both. In the case in question this can be accomplished by setting the brushes to a different position by turning the commutator about the shaft, or, as I have here shown for simplicity, by moving the commutator-cylinder longitudinally with relation to the brushes in the case where the cylinder has inclined slots. In accordance with this plan the parts are so adjusted that on an increase of speed the parts of the commutator will be set relatively in less effective position, and so restore the normal or nearly normal running of the motor.

The construction of the generator may be widely varied. A description of details is not necessary in the present state of the art, suffice it to say that the armature W is of any known kind suitable to be revolved in a magnetic field and return alternating currents in its conductor and rings r r. In order to automatically control the current in the local I provide a means for changing the speed of the motor, and control such speed-changer by an electromagnet connected to the local.

Figure 1:
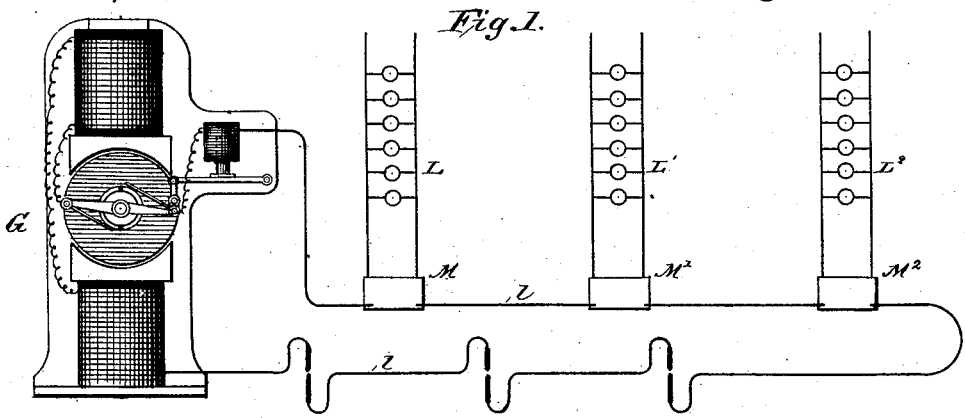
Figure 2:
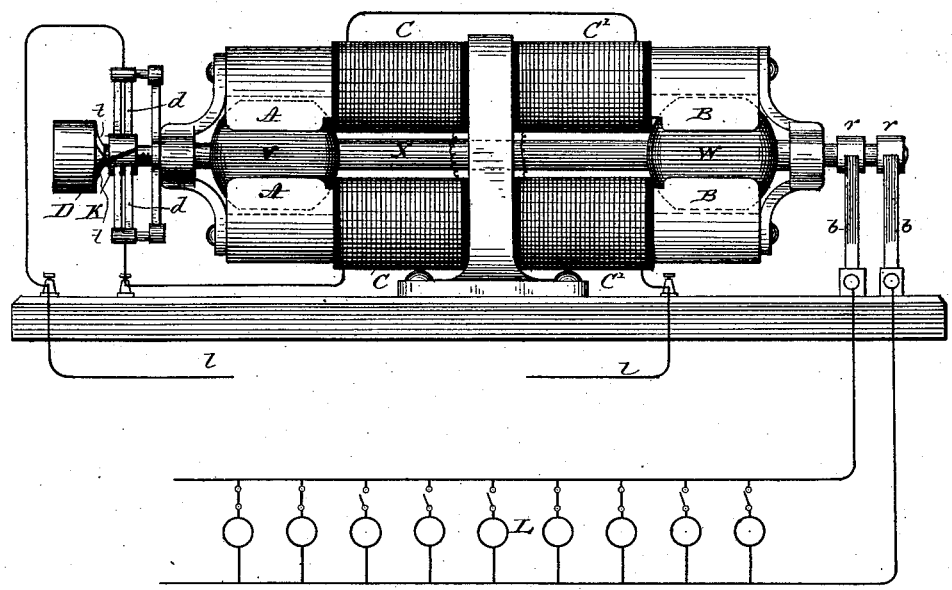
Figure 3:
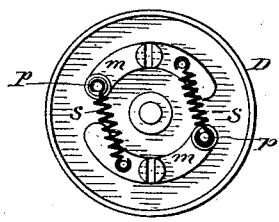
Figure 4:
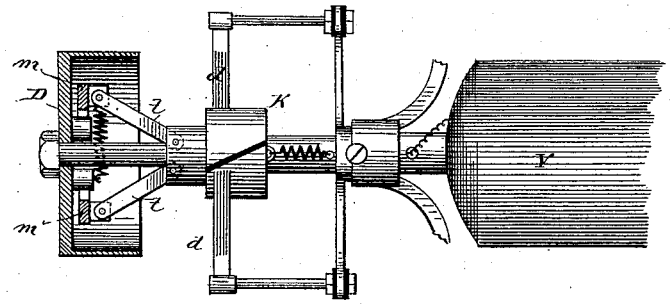
Figure 5:
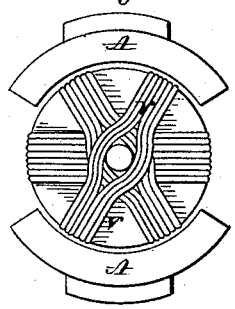
Fig. 5 shows an end view of the motor-armature and its poles A A.
Figure 6:
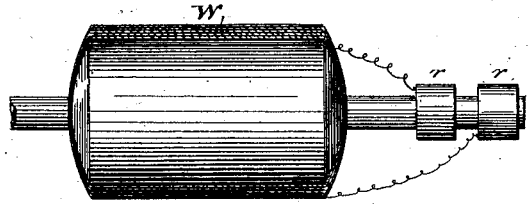
Fig. 6 is a side view of the single coil upon the armature of the generator and shows how the terminals of the coil are connected to rings r r.
Figure 7:
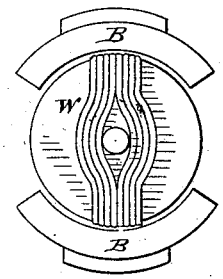
Fig. 7, an end view of same with its poles B B.
Figure 8:
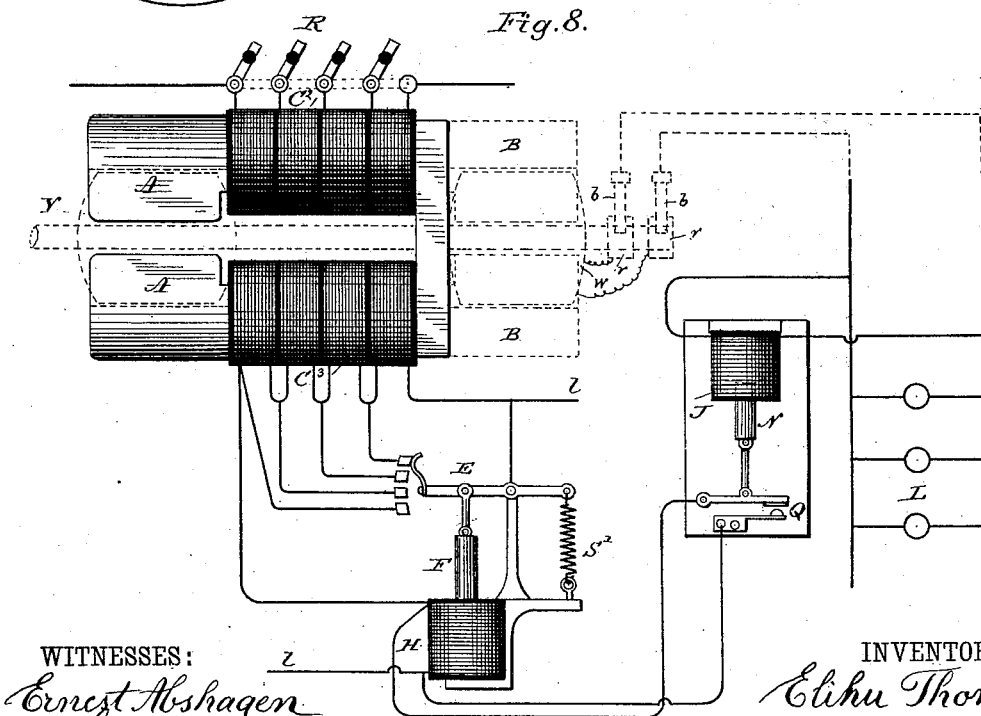

In Fig. 8 means of controlling the power of the motor both by hand and by automatic devices in accordance with this portion of my invention are shown. As a means of controlling the speed, I in this case make use of the well-known expedient of varying the strength of the field in which the motor-armature moves, which may be done by varying the amount of exciting-current applied to the field-magnet core—as, for instance, by shunting current from the coils or by cutting out sections of the field-magnet coil. In place of such expedient, I might obviously use the device of adjusting the commutator to more or less effective positions, the adjustment being governed by similar devices to those to be now described, or by other means controlled by the current in the local.

In the arrangement shown in Fig. 8 the field-coil $C^2$ is wound in sections, which may by suitable switches be cut out or short-circuited to weaken the field in which the armature V revolves. The coil $C^3$ is also so divided, and a set of shunting-contacts traversed by a spring-contact carried by a lever, E, is arranged so that when said lever E is depressed more and more of $C^3$ is shunted. The lever E is controlled by a core, F, and coil H in the circuit l l, except when short-circuited at q by contacts therefor. The contacts at q are opened by a coil, J, and core N only when said coil has more than a certain flow of current in it. The coil J is in a bridge around the lights on the local circuit L, and it is of high resistance. The core N is of fine iron wire, so as to respond to the alternating currents in J. When the electro-motive force of the local line is too great, the core N is raised, opening the contacts q, and thereby causing increased energizing of coil H, consequent attraction of its core F, and movement of the lever E, so as to shunt more of $C^3$. In consequence of this the armature V runs more slowly, as it moves in a weaker field. The electro-motive force of the alternating currents in L also falls, so as again to permit light closure of contacts q. The normal condition is that the contacts q are kept in a tremor of closing and opening, which maintains the core F in such position as to cause due shunting of $C^3$, such as to give nearly constant electro-motive force at L.

I do not limit myself to any particular form of switches or magnets, since many arrangements will readily suggest themselves to those skilled in the art as a suitable means for controlling the speed-varying devices by a change in the current on the local.

A combined adjustable commutator and centrifugal governor forms the subject of an application for patent filed by me August 30, 1884, and no claims are therefore made to such a device in the present application.

What I claim as my invention is—

1. The combination, with a motor in one circuit and a generator driven thereby and supplying current to another circuit, of devices for governing the speed or power of the motor, governed by a magnet in the motor-circuit, and a controlling-magnet connected to the generator-circuit.

2. The combination, with an electric motor, of an alternating current-generator supplying current to a local circuit, speed or power regulating devices applied to the motor, a governing-magnet for said regulating devices placed in the motor-circuit, and a controlling-magnet connected to the local circuit.

3. The combination, with an electric motor driven by current in one circuit, of a generator driven thereby, a second circuit containing translating devices and connected to said generator, and a controlling electro-magnet varying in power with the variations in current on the local, and serving to regulate the current on the local by regulating the power or speed of the motor.

4. The combination, with an electric motor in one circuit and a generator driven thereby and connected to another circuit, of a variable magnetic field for the motor and a controlling electro-magnet for determining the strength of the field, said magnet being responsive to varitions in the circuit and connected to the generator.

5. The combination, with an electric motor in one circuit and a generator driven thereby and supplying current to another circuit, of sectional field-magnet coils for the motor, a switch for determining the number of such coils at any time in action, and controlling devices for said switch responsive to changes in the circuit connected to the generator.

6. The combination, with an electric motor in one circuit, of a generator driven thereby and supplying current to another circuit, a governing-magnet whereby through suitable devices the strength of the field-magnet for the motor may be varied, and a controlling electro-magnet responsive to variations in the current on the generator-circuit.

Signed at Lynn, in the county of Essex and State of Massachusetts, this 26th day of August, A. D. 1884.

ELIHU THOMSON.

Witnesses:
A. P. SEYMOUR,
W. O. WAKEFIELD.